US011403478B2

(12) United States Patent
Boidol et al.

(10) Patent No.: US 11,403,478 B2
(45) Date of Patent: Aug. 2, 2022

(54) ENTROPY-BASED VALIDATION OF SENSOR MEASUREMENTS

(71) Applicant: SIEMENS AKTIENGESELLSCHAFT, Munich (DE)

(72) Inventors: Jonathan Christoph Boidol, Munich (DE); Andreas Hapfelmeier, Sauerlach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 863 days.

(21) Appl. No.: 15/383,288

(22) Filed: Dec. 19, 2016

(65) Prior Publication Data

US 2017/0195090 A1 Jul. 6, 2017

(30) Foreign Application Priority Data

Jan. 4, 2016 (DE) .................... 10 2016 200 005.5

(51) Int. Cl.
*G06K 9/00* (2022.01)
*G06N 7/00* (2006.01)
(Continued)

(52) U.S. Cl.
CPC ......... *G06K 9/00496* (2013.01); *G06N 7/005* (2013.01); *G06F 9/5066* (2013.01);
(Continued)

(58) Field of Classification Search
None
See application file for complete search history.

(56) References Cited

U.S. PATENT DOCUMENTS 7,299,088 B1 * 11/2007 Thakor ................. A61B 5/048
600/544
8,296,850 B2 * 10/2012 Srinivasa ............ H04L 63/1416
726/26
(Continued)

FOREIGN PATENT DOCUMENTS

| CN | 102456069 A | 5/2012 |
| CN | 104517041 A | 4/2015 |
| CN | 105069469 A | 11/2015 |

OTHER PUBLICATIONS

Jiang, Miao; Munawar, Mohammad A.; Reidemeister, Thomas; and Ward, Paul A.S.—"Efficient Fault Detection and Diagnosis in Complex Software Systems with Information—Theoretic Monitoring"; IEEE Transactions on Dependable and Secure Computing, vol. 8, No. 4, Jul./Aug. 2011. (Year: 2011).*

(Continued)

*Primary Examiner* — Kyle R Quigley
*Assistant Examiner* — Leonard S Liang
(74) *Attorney, Agent, or Firm* — Schmeiser, Olsen & Watts LLP (57) ABSTRACT

A method and module for detecting dependencies of at least two data streams of sensor measurements is provided, which are recorded on a technical device, in particular in an energy generation device, including: an input interface which is adapted for capturing the streams of sensor data from sensors, a data structure for analysis in form of a sliding window which is incrementally moved over the respective streams of sensor data so that there is an overlap between consecutive windows, and a processor, which is adapted to apply an entropy-based algorithm on the data within the sliding window for calculating data stream dependencies, (Continued)

while incrementally moving the sliding window, wherein only updated data in the sliding window is processed by the entropy based algorithm.

10 Claims, 10 Drawing Sheets

(51) Int. Cl.

| | |
|---|---|
| H04W 4/70 | (2018.01) |
| G06N 20/00 | (2019.01) |
| G06N 5/04 | (2006.01) |
| H04L 9/40 | (2022.01) |
| G06F 9/50 | (2006.01) |
| G06F 16/2455 | (2019.01) |
| G06F 17/18 | (2006.01) |
| G06F 30/20 | (2020.01) |
| G06F 111/10 | (2020.01) |
| H04L 1/20 | (2006.01) |
| H04W 24/10 | (2009.01) |

(52) U.S. Cl.
CPC ........ *G06F 16/24568* (2019.01); *G06F 17/18* (2013.01); *G06F 30/20* (2020.01); *G06F 2111/10* (2020.01); *G06K 9/00536* (2013.01); *G06N 5/04* (2013.01); *G06N 20/00* (2019.01); *H04L 1/203* (2013.01); *H04L 63/1425* (2013.01); *H04W 4/70* (2018.02); *H04W 24/10* (2013.01)

(56) References Cited

U.S. PATENT DOCUMENTS

| | | | | |
|---|---|---|---|---|
| 9,218,382 | B1* | 12/2015 | Muntes | G06F 11/3476 |
| 9,245,235 | B2* | 1/2016 | Chen | G06F 17/18 |
| 9,313,322 | B2* | 4/2016 | Ma | H04W 4/021 |
| 9,961,547 | B1* | 5/2018 | Molina-Markham | H04W 12/06 |
| 11,176,483 | B1* | 11/2021 | Sundararaman | G06F 16/24568 |
| 2007/0294247 | A1* | 12/2007 | Papadimitriou | G06K 9/00496 |
| 2009/0164405 | A1* | 6/2009 | Yang | G06K 9/6214 |
| | | | | 706/46 |
| 2011/0313844 | A1* | 12/2011 | Chandramouli | G06Q 30/0241 |
| | | | | 705/14.42 |
| 2011/0320388 | A1* | 12/2011 | Wong | G05B 23/0232 |
| | | | | 706/12 |
| 2012/0209817 | A1* | 8/2012 | Golab | G06F 16/254 |
| | | | | 707/688 |
| 2014/0149806 | A1* | 5/2014 | Khalastchi | G06F 11/3466 |
| | | | | 714/49 |
| 2014/0155043 | A1* | 6/2014 | Gell | H04W 4/60 |
| | | | | 455/414.1 |
| 2016/0364010 | A1* | 12/2016 | Amma | G06K 9/00355 |
| 2017/0177546 | A1* | 6/2017 | Heinz | G06F 16/24568 |
| 2017/0301111 | A1* | 10/2017 | Zhao | G01C 25/005 |
| 2018/0307731 | A1* | 10/2018 | Xiao | G06F 17/16 |
| 2018/0367463 | A1* | 12/2018 | Jose | H04L 1/1812 |
| 2020/0293920 | A1* | 9/2020 | Chung | G06N 20/00 |

OTHER PUBLICATIONS

Kopylova, Y., Buell, D.A., Huang, C.T., & Janies, J. (2003). Mutual Information Applied to Anomaly Detection. KICS. (Year: 2003).*

Keller, F., Muller, E., & Bohm, K. (2015). Estimating Mutual Information on Data Streams. SSDBM '15 Jun. 29-Jul. 1, 2015, La Jolla, CA, USA. http://dx.doi.org/10.1145/2791347.2791348 (Year: 2015).*

Altiparmak, F., Tuncel, E., & Ferhatosmanoglu H. (2007). Incremental Maintenance of Online Summaries over Multiple Streams. IEEE Transactions on Knowledge and Data Engineering, 20(2), 216-229. (Year: 2007).*

European Search Report dated Jun. 19, 2017 for Application No. 16196322.8; 8 pgs.

Seliniotaki A., Tzagkarakis G., Christofides V., and Tsakalides P., "Stream correlation monitoring for uncertainty-aware data processing systems," in Information, Intelligence, Systems and Applications, IISA 2014, The 5th International Conference on. IEEE, 2014, pp. 342-347.

Zhu Y. and Shasha D., "Statstream: Statistical monitoring of thousands of data streams in realtime," in Proceedings of the 28th international conference on Very Large Data Bases. VLDB Endowment, 2002, pp. 358-369.

Dionisio A., Menezes R., and Mendes, D. A. , "Mutual information: a measure ofdependency for nonlinear time series," Physica A: Statistical Mechanics and its Applications, vol. 344, No. 1, pp. 326-329, 2004.

Chinese Office Action dated Jul. 29, 2020 for Application No. 201710003688.2.

* cited by examiner

Algorithm 1 Window-wise Computation of Dependencies

---

1: procedure MID(data streams S)
2:     for $s^{t,w} \in S$ do
3:         $\hat{s} \leftarrow$ Discretize ($s^{t,w}$)
4:         $P \leftarrow$ getPDF ($\hat{s}$)
5:         $H \leftarrow$ entropy (P)     ▷ generate PDFs
6:         $CH \leftarrow$ condEntropy (P)    ▷ for all pairs
7:         $\hat{I} \leftarrow$ norm(H,CH)         of streams
8:         yield $\hat{I}$
9:     end for
10: end procedure

---

Algorithm 2 Incremental Computation of Dependencies

---

1: procedure OMID(data streams S)
2:     $\hat{s} \leftarrow$ PiDiscretize ($s^{1,w}$)
3:     $P \leftarrow$ getPDF ($\hat{s}$)
4:     $H \leftarrow$ entropy (P)     ▷ initialize from
5:     $CH \leftarrow$ condEntropy (P)    window of first
6:     for $s^{t,1} \in S, t > w$ do    w values
7:         $\hat{s}^t \leftarrow$ PiDiscretize ($s^t$)
8:         $P' \leftarrow$ delete(P, $\hat{s}^{t-w-1}$)    ▷ update PDF with new
9:         $P' \leftarrow$ add($P'$, $\hat{s}^t$)        frequency counts
10:       $H \leftarrow$ update(H,P,P')    ▷ update H and CH
11:       $CH \leftarrow$ update(CH,P,P')   with Equ. 9 and 10
12:       $P \leftarrow P'$
13:       $\hat{I} \leftarrow$ norm(H,CH)
14:       yield $\hat{I}$
15:     end for
16: end procedure

ENTROPY-BASED VALIDATION OF SENSOR MEASUREMENTS

CROSS-REFERENCE TO RELATED APPLICATION

This application claims priority to German Application No. 10 2016 200 005.5 having a filing date of Jan. 4, 2016 the entire contents of which are hereby incorporated by reference.

FIELD OF TECHNOLOGY

The following refers to the validation of measurement signals in technical devices, like energy generation devices with a plurality of sensors for pressure, voltage, current, etc. In particular, the following relates to a method for detecting dependencies in two or more data streams of sensor measurements, to an electronic module and to a computer program.

BACKGROUND

Sensors for technical values like voltage, current, pressure and the like are usually used in a large-scale wireless sensor network (WSN). The sensor networks may be used for remote monitoring of technical devices and industrial plants. This progress has spurred the need for processes and applications that work on high dimensional streaming data. Streaming data analysis is concerned with applications where the records are processed in unbounded streams of information. The nature and volume of this type of data make traditional batch learning exceedingly difficult, and fit naturally to algorithms that work in one pass over the data, i.e. in an online-fashion. To achieve the transition from batch to online algorithms, window-based and incremental algorithms are popular, often favoring heuristics over exact results.

Instead of relying only on single stream statistics to e.g. detect anomalies or find patterns in the data, embodiments of the invention is concerned with a setting where many sensors are used for monitoring in close proximity or closely related phenomena, for example temperature sensors in close spatial proximity or voltage and rotor speed sensors in large turbines.

In state of the art, several approaches are known to detect pair-wise correlations or dependencies between pairs or groups of data streams. The best known indicator for pair-wise correlation is the Pearson's correlation coefficient $\rho$ essentially the normalized covariance between two random variables. Direct computation of $\rho$, however, is prohibitively expensive and, more problematic, it is only a suitable indicator for linear or linear transformed relationships. Non-linearity in time-series has been studied to some extent and may arise for example due to shifts in the variance or simply if the underlying processes are determined by non-linear functions.

SUMMARY

An aspect relates to an option to reduce errors in sensor signal measurements. Further, sensor data analysis should be accelerated and should, in particular, be executable in linear execution time.

According to a first aspect the present invention refers to a method for detecting dependencies of at least two data streams of sensor measurements, which are recorded on a technical device, in particular in an energy generation device. The method comprises the following steps:
  Capturing the streams of sensor data
  Defining a data structure for analysis in form of a sliding window which is incrementally moved over the respective streams of sensor data so that there is an overlap between consecutive windows. Preferably, the window is moved over all streams of sensor data in parallel within a certain time phase.
  Applying an entropy-based algorithm on the data within the sliding window for calculating data stream dependencies, while incrementally moving the sliding window, wherein only updated data in the sliding window is processed by the entropy based algorithm.

A data stream is a sequence of sensor signal measurement data. The sequence may be a sequence of digits or other values or digital or analog signals. Usually, a plurality of data streams is processed in parallel. In particular, at least two streams are compared and all streams may be compared pair-wise. The data stream may be captured directly from the sensors or may be read in from a memory storage.

The sliding window is a data structure, which is virtually moved over the data stream. The sliding window may be construed as data set with a configurable length or breadth and which comprises an amount of numbers or digits. The window is moved over all streams in parallel and contains data from all streams from a time period of specified length.

The sensor signals may stem from an energy generation device or parts thereof, like turbines, or from other technical devices. The sensor signal may refer to measurements of temperature, pressure, voltage, current, resistance, etc., and are usually represented as real numbers but may be represented categorically, (e.g. "high", "low", "normal", "safe", "unsafe" etc.).

The entropy based algorithm is based on mutual information of the respective data streams.

In a preferred embodiment, a breadth of the sliding window is configured in a configuration phase. The configuration phase is executed before execution time of the algorithm and serves for defining configurable parameters.

In another preferred embodiment, the method is executed in real time. This means that the method is executed with a constant amount of processing steps per new data:
  for discretization of the data (at least for an OMID embodiment of the invention with an online discretization)
  for updating the probability distribution
  for calculating the dependency scores,
  wherein the respective steps, mentioned above, build on each other.

In another preferred embodiment, the result is provided on an output device, representing whether or not there exists a dependency between the sensor data streams and if yes, whether the dependency is represented correctly. The result may be represented graphically, in particular in a histogram based format.

Typically, the method is used for detecting errors and/or correlations in the data streams.

Preferably, the breadth of the sliding window is configured such as a minimal overlap between consecutive windows is provided.

As an advantage, the respective data streams to be analyzed may comprise continuous and/or discrete data.

In an embodiment of present invention, the so called MID-embodiment, dependencies of the data streams are computed in a window-wise manner. Preferably, this embodiment is used as an intermediate step within a so called OMID embodiment (see below). In the MID approach, discretization is only based on the data within the respective window, which are known at the respective point of time. This embodiment allows for an incremental processing. In this so called MID embodiment, discretization of a value may change from window to window. Therefore, it is necessary to calculate the entropy anew for each window.

In a more preferred embodiment of present invention, the so called OMID-embodiment, dependencies of the data streams are computed in an incremental manner and—in particular—by means of an online discretization. In this respect the term "online" refers to the discretization without prior knowledge of the whole data stream of sensor data. With other words, the sensor data may be read in from the sensors in an online manner. In this embodiment an algorithm for processing mutual information is adapted into OMID, which is a convenient, global measure to detect dependencies between data streams. In this so called OMID embodiment entropy is only processed for the new increment of the updated window data, whereas in the above mentioned MID embodiment, entropy is always processed for all data in the window.

According to another aspect the invention refers to an electronic module for detecting dependencies of at least two data streams of sensor measurements, which are recorded on a technical device, in particular in an energy generation device, comprising:

An input interface which is adapted for capturing the streams of sensor data from sensors A data structure for analysis in form of a sliding window which is incrementally moved over the respective streams of sensor data so that there is an overlap between consecutive windows and A processor, which is adapted to apply an entropy-based algorithm on the data within the sliding window for calculating data stream dependencies, while incrementally moving the sliding window, wherein only updated data in the sliding window is processed by the entropy based algorithm.

In another aspect the invention refers to a computer program product, tangibly embodying a program of machine-readable instructions executable by a digital processing apparatus to perform a method according to one of the preceding claims, if the program is executed on the digital processing apparatus.

The algorithm utilizes the—in some sense redundant, or rather shared—information between sensor pairs to validate measurements. The task at hand becomes then to reliably and efficiently compute and report dependencies between pairs or groups of data streams. According to embodiments of the invention, unusual sensor readings may be detected. It is possible to differentiate between cases where these readings are due to actual changes in the monitored system on the one hand side or due to measuring uncertainties on the other hand side.

The algorithm that is used to detect dependencies in high volume and high dimensional data streams based on the mutual information between time series. The three-fold advantages of the present approach are that mutual information captures global dependencies, is algorithmically suitable to be calculated in an incremental fashion and can be computed efficiently to deal with high data volume without the need for approximation short-cuts. This leads to a dependency measure that is significantly faster to calculate and more precise at the same time.

In another aspect the present invention refers to a tangibility, embodying a program of machine-readable instructions executable by a digital processing apparatus, like a computer, to perform a method for detecting dependencies in two or more sensor data streams, stemming from the technical device. The program may be stored on a computer readable medium.

BRIEF DESCRIPTION

Some of the embodiments will be described in detail, with reference to the following figures, wherein like designations denote like members, wherein.

DETAILED DESCRIPTION

{Dionisio2004} argue that mutual information is a practical measure of dependence between random variables directly comparable to the linear correlation coefficient, but with the additional advantage of capturing global dependencies, aiming at linear and non-linear relationships without knowledge of underlying theoretical probability distributions or mean-variance models.

StatStream {Zhu2002} and PeakSimilarity {Seliniotaki2014} are algorithms to monitor stream correlation. Both employ variants of a discrete Fourier transformation (DFT) to detect similarities based on the data compression qualities of DFT. More specifically, they exploit that DFT compresses most of a time series' information content in few coefficients and develop a similarity measure on these coefficients. StatStream also uses hashing to reduce execution time.

The algorithm according to embodiments of the invention is based on mutual information. The algorithm's accuracy and execution time is compared to the DFT-based measures and the correlation coefficient.

Mutual Information

Mutual information is a concept originating from Shannon information theory and can be thought of as the predictability of one variable from another one. Some of its properties are exploited for the algorithm. Since the mathematical aspects are quite well-known and described extensively elsewhere, e.g., just the basic background and notation needed will be mentioned here.

The mutual information between variables X and Y is defined as $$I(X, Y) = \sum_{y \in Y} \sum_{x \in X} p(x, y) \log\left(\frac{p(x, y)}{p(x)p(y)}\right) \quad (1)$$

or equivalently as the difference between the Shannon-entropy H(X) and conditional entropy H(X|Y):

$$I(X;Y)=H(Y)-H(Y|X) \quad (2)$$

Shannon-entropy and conditional entropy are defined as $$H(X) = \sum_{x \in X} p(x) \log\left(\frac{1}{p(x)}\right), \quad (3)$$

$$H(X \mid Y) = \sum_{y \in Y} \sum_{x \in X} p(x, y) \log\left(\frac{p(y)}{p(x)p(y)}\right) \quad (4)$$

I(X;Y) is bounded between 0 and max(H(X),H(Y))=log (max(|X|,|Y|) so we can define a normalized Î(X; Y) which becomes 0 if X and Y are mutually independent and 1 if X can be predicted from Y and vice versa. This makes it easily comparable to the correlation coefficient and also forms a proper metric.

$$\hat{I}(X; Y) = 1 - \frac{I(X;Y)}{\log(\max(|X|, |Y|))} \quad (5)$$

Next, we want to compute Î for pairs of streams $s_i \in S$ at times t. The streams represent a measurement series $s_i = (\ldots, m_t^i, m_{t+1}^i, m_{t+2}^i, \ldots)$ without beginning or end so we add indices $s_i^{t,w}$ to denote measurements from stream $s_i$ from time t to t+w−1, i.e. a window of length w. We will drop indices where they are clear from the context. Our goal is then to efficiently calculate the stream dependencies $D_t$ for all points t in the observation period $t \in [0; \infty)$ $$D_t^w = \{\hat{I}(s_i^{t,w}, s_j^{t,w}) | s_i, s_j \in S\} \quad (6)$$

Figure 1:
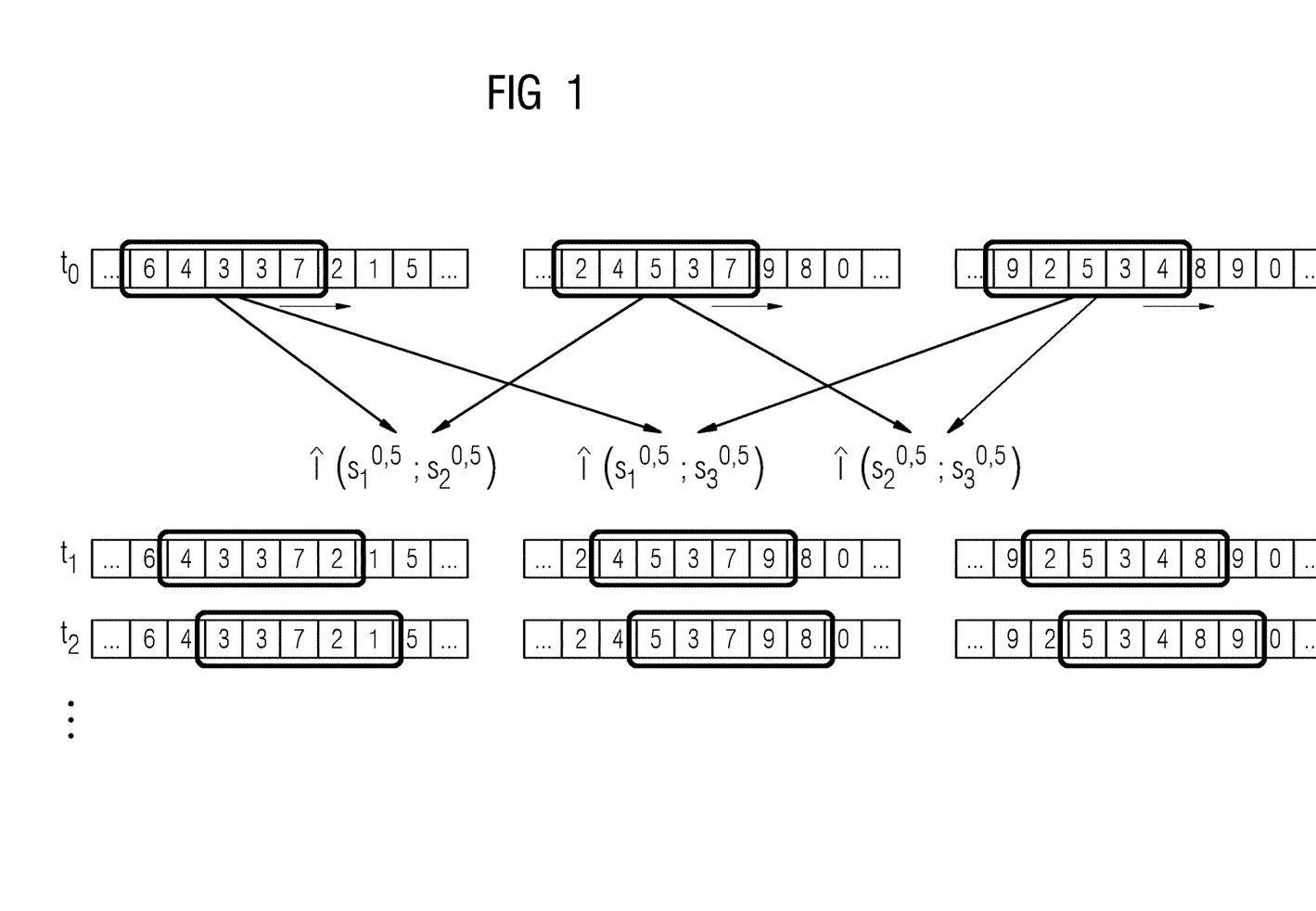
FIG. 1 shows a schematic representation of a sliding window and pair-wise calculation of mutual information for a data stream with window size w=5 and |S|=3.
Figure 2:
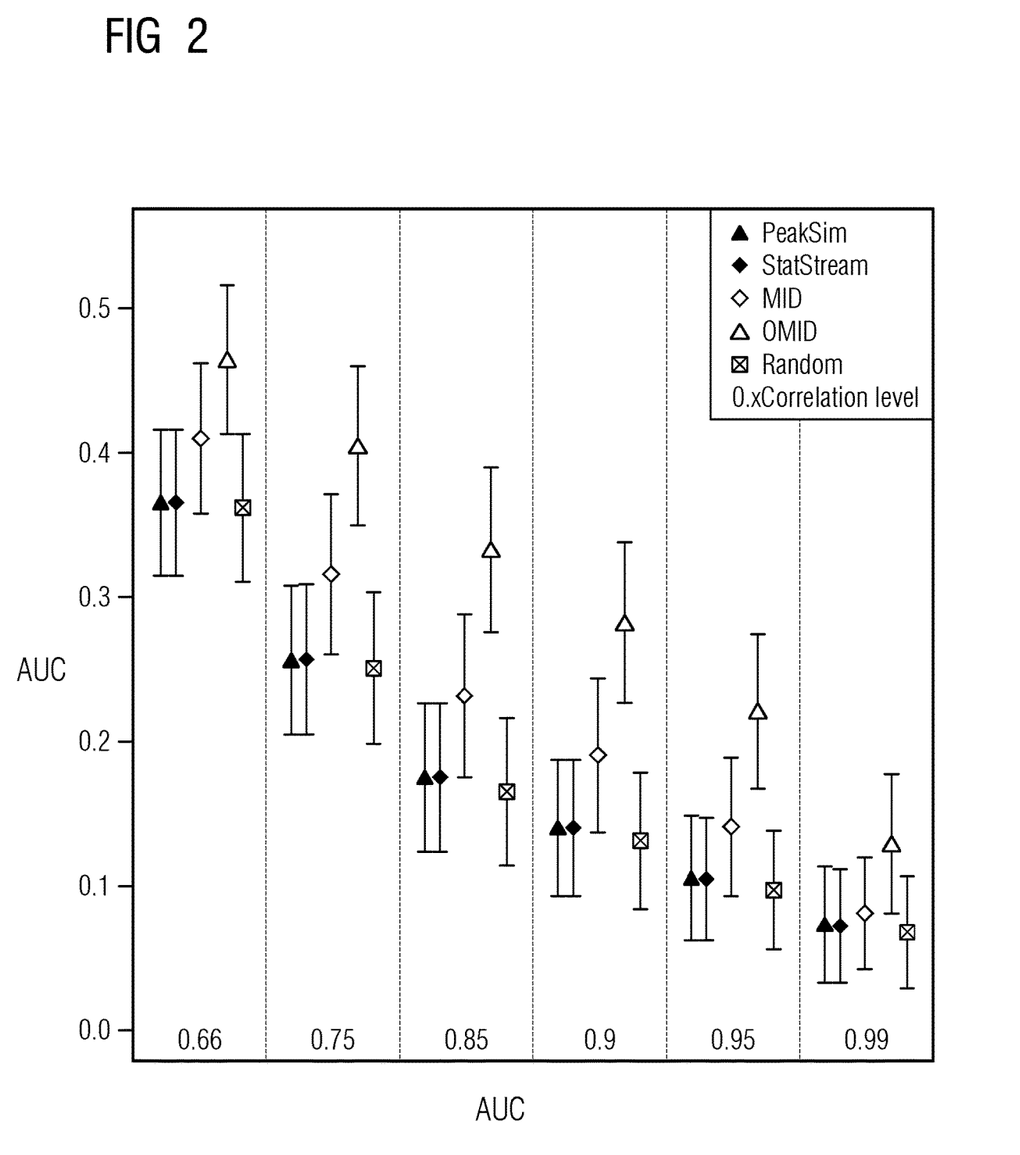
FIG. 2 shows an area under ROC curve on an OL-dataset.

FIG. 1 demonstrates the basic window approach for a stream with three dimensions.

Updating Mutual Information

To integrate the mutual information into the streaming algorithm, we exploit the overlap between $D_t$ and $D_{t+1}$. We implicitly assume a step size k of 1 which means we move the window in the smallest possible increments to achieve the best resolution. In some cases, larger step sizes may be desired, but the same principles apply in general as long as the overlap between consecutive windows is large or k≪w.

We see immediately from equation 1 that for a calculation of $D_t$ we only need the probabilities p(x,y) for every pair $(s_i, s_j)$ and p(x) for n streams $s_i$. Moreover, once we move one time step from time t to t+1, we can update $D_{t+1}$ from $D_t$, since most of the involved probabilities and therefore most terms in the necessary sums stay constant. As the window over the data moves on, elements $m_t$ that are out of date drop out and new elements $m_{t+w+1}$ enter. The probabilities $p(m_t)$ and $p(m_{t+w+1})$ for each stream and the respective joint probabilities need to be adjusted to $p'(m_t)$ etc., which is done in constant time.

For example, for the particular pair $s_i^{t+1}, s_j^{t+1}$ we already know $\hat{I}(s_i^t, s_j^t)$ or equivalently H($s_i^t$) and H($s_j^t|s_i^t$) since we are only interested in the variable terms (see equation 2). Rather than recomputing from scratch, we define $$\Delta(m) = p'(m)\log(p'(m)) - p(m)\log(p(m))$$

and use $$H(s_j^{t+1}) = H(s_j^t) + \Delta(m_t^j) + \Delta(m_{t+w+1}^j) \quad (7)$$

and likewise define $$\Delta(m, n) = p'(m, n)\log\left(\frac{p'(m)}{p'(m, n)}\right) - p(m, n)\log\left(\frac{p(m)}{p(m, n)}\right)$$

and update all joint probabilities in the conditional entropy summation $$H(s_j^{t+1} \mid s_i^{t+1}) = H(s_j^t \mid s_i^t) + + \sum_{y \in s_j} \Delta(m_t^i, y) + \quad (8)$$

$$\sum_{y \in s_j} \Delta(m_{t+w+1}^i, y) + \sum_{x \in s_i} \Delta(x, m_t^j) + \sum_{x \in s_i} \Delta(x, m_{t+w+1}^j).$$

Compared with equation 6 we got rid of the double sum, which reduces the number of expensive log operations from quadratic to linear (in the size of the sample space of $s_i$ and $s_j$ respectively). Also, in practice Δ(m) and Δ(m,n) pleasingly often equal zero, reducing the required number of operations further. In summary, we reduce time complexity to $O(\tilde{S}^2)$ where $\tilde{S} = \max_{s \in S}(|S|)$ with space complexity $O(\tilde{S}^2)$ to store the probability distribution.

Online Estimation of Probability Distribution Functions (PDFs)

Two problems remain to determine the (empirical) probability distribution functions we need to calculate entropy and mutual information. First, data streams often contain both nominal event data and real values. Consequentially our model needs to deal with both continuous and discrete data types. Second, the underlying distribution of both single stream values and of the joint probabilities is usually unknown and must be estimated from the data.

There are three basic approaches to formulate a probability distribution estimate: Parametric methods, kernel-based methods and binning. Parametric methods need specific assumptions on the stochastic process and kernel-based methods have a large number of tunable parameters where sensible choices are difficult and maladjustment will lead to biased or erroneous results. {Dionisio2004} Binning or histogram-based estimators are therefore the safer and more feasible choice for continuous data which have been well studied, and naturally fit for discrete data. They have been used convincingly in different applications. {Dionisio2004} Quantization, the finite number of observations and the finite limits of histograms—depending on the specific application—might lead to biased results. However, {Dionisio2004} argue that both equidistant and equiprobable binning lead to a consistent estimator of mutual information.

Of the two fundamental ways of discretization—equal-width or equal-frequency—equal-width binning is algorithmically slightly easier to execute, since it is only necessary to keep track of the current minimum and maximum. Equal frequency binning requires more effort, but has been shown to be the better estimator for mutual information. We confirmed this in a separate set of experiments and consequentially use equal frequency binning for our measure.

For our algorithm, we can either discretize on a per-window-basis, or employ an online discretizer. For the latter we chose PiD. A window-wise discretization gives us a local view on the data since it depends only on the properties of the data in the window but is also limited to the data currently available. An online discretization on the other hand incorporates previous knowledge over the measurements, i.e. the global density of the distribution seen so far.

Regular equal-frequency discretization sorts all values and divides them in equal sized bins. That is reasonable for a current window, a local section of the stream, but obviously impossible for the whole stream. An immediate discretization and a global view on the distribution in a single pass on the data is achieved with an online discretization step. The linear run time is bought with histogram boundaries with an error within $$l * \frac{2}{2*b},$$

where b denotes the desired number of bins, l a constant, and R is the range of the random variable. We give a short overview here, and refer to for more details to the online discretization we used. The PiD discretization works with two sets of histograms. An invisible operative histogram tallies the data; a second visible layer serves as the final histogram. Each observed value updates the background tally. Whenever a bin reaches a user defined threshold (a percentage of the total number of points seen so far), a split operator triggers, generating a new interval. The process of updating the background histogram works online, performing a single scan over the data stream. It processes each example in constant time and space.

We have therefore two variants to calculate $\hat{I}(x; Y)$, depending on your choice for the discretization: Online or per-window discretization. We call $\hat{I}(x; Y)$ with per-window discretization MID—mutual information dependency and $\hat{I}(x; Y)$ with online discretization OMID for online mutual information dependency.

The window-based discretization possibly changes the histogram boundaries in the window and therefore the underlying empirical probability distribution at each step. It guarantees the correct boundaries for the current window but has to be recomputed with every value in each window. The discretization used with OMID is less precise but stable beyond the current window (every value is assigned to the same bin independent from the window position) which allows the update process described in section "Updating mutual information" (above). This implies greater accuracy for MID and better runtime for OMID. We evaluate and compare the actual outcome of both variants in section "Experimental Evaluation" (below).

Figure 9:
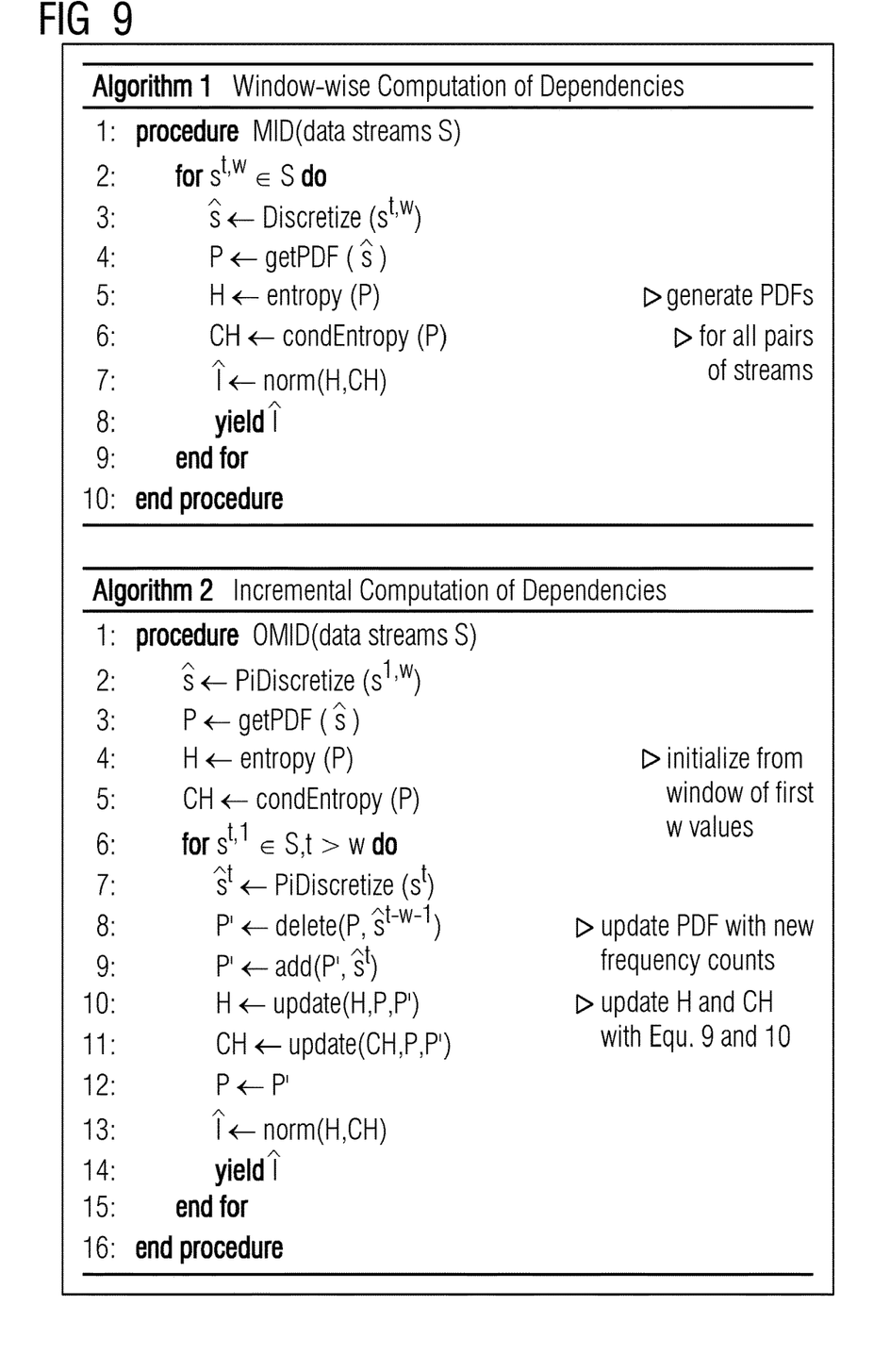
FIG. 9 is a formalized notion of Algorithm I/MID and Algorithm II/OMID.

FIG. 9 shows the two algorithms MID and OMID in an abstract notion language, i.e. in pseudo code.

Experimental Evaluation

We evaluate MID and OMID against two other algorithms for stream correlation monitoring and on three datasets. Results for individual datasets are shown in FIGS. 2 to 7, Tables I and II show an overview to compare methods with each other.

Datasets

We use three datasets to evaluate our algorithm with different numbers of time steps and dimensions, ranging from 32.000 to 8.3 million measurements in total. They have been used to emulate the high volume data streams consistently and allow comparison of the methods.

NASDAQ (NA) contains daily course information for 100 stock market indices from 2014 and 2015, with 600 indicators (including e.g. open and high course or trading volume) over 320 days in total.

PersonalActivity (PA) is a dataset of motion capture where several sensors have been placed on five persons moving around. The sensors record their three-dimensional position. This dataset contains 75 data points each from 5.255 time steps OFFICE (OL) is a dataset by the Berkley Research Lab, that collected data about temperature, humidity, light and voltage from sensors placed in a lab office. We use a subset of 32 sensors since there are large gaps in the collection. The subset still contains some gaps that have been filled in with a missing-value indicator. In total, these datasets contain 128 measurements over 65.537 time steps.

Experimental Settings

Window size w determines the scale of correlation we are interested in and eventually has to be chosen by the user. For the purpose of this evaluation we set it equivalent to 30 seconds for the sensor datasets and to 4 weeks for the stock market dataset. The number of bins b for the discretization needs to be small enough to avoid singletons in the histogram but large enough to map the data distribution. As a compromise we chose b=20 for the experiments. We calculate dependency of every dimension with every other, e.g. voltage with temperature. So, for a dataset n*d or with n steps and d dimensions we calculate $$(n-w) * \binom{d}{2}$$

dependency scores. Statistical significance is determined with a standard two-sided t-test.

Evaluation Criteria

We chose to evaluate our algorithms at six levels of correlations, from weak to strong correlation, where we deem a windowed pair of streams with correlation coefficient above 0.66, 0.75, 0.85, 0.9, 0.95 and 0.99 respectively as of interest. Accordingly, we classify each window as 0 or 1. For each level, we provide the area under ROC curve as classification measure that is independent from the number of true positives in the dataset. This number varies naturally with the desired level of correlation. Also, we report the maximum F1-measure, i.e. the harmonic mean of precision and recall, along the precision recall curve for each algorithm.

Results

FIGS. 2 to 7 show F1-measure (±standard deviation) and AUC (±standard deviation) for the three datasets. Random has been determined by allocating a random value uniformly chosen from [0,1] as dependency measure to each pair of stream windows.

The following Table 1 shows a direct overview of all datasets: Numbers indicate significant improvement in AUC (p-value<0.1 in a two-sided t-test) of row vs. column in 24 experiments. OMID scores a total of 51:

| AUC improvement | | | vs | |
| --- | --- | --- | --- | --- |
| | MID | OMID | SStr | PkSi |
| MID | — | 13 | 18 | 18 |
| OMID | 6 | — | 22 | 23 |
| StatStream | 2 | 0 | — | 15 |
| PeakSim | 1 | 0 | 1 | — |

Direct overview of all datasets: Numbers indicate significant improvement in AUC (p-value<0.1 in a two-sided t-test) of row vs. column in 24 experiments. OMID scores a total of 51.

The following table II shows a direct overview of all datasets: Numbers indicate significant improvement in F1 value (p-value<0.1 in a two-sided t-test) of row vs. column in 24 experiments. MID and OMID score 40 wins each.

| F1 improvement | | | vs | |
| --- | --- | --- | --- | --- |
| | MID | OMID | SStr | PkSi |
| MID | — | 7 | 19 | 14 |
| OMID | 10 | — | 18 | 12 |
| StatStream | 0 | 0 | — | 1 |
| PeakSim | 4 | 7 | 17 | — |

Figure 3:
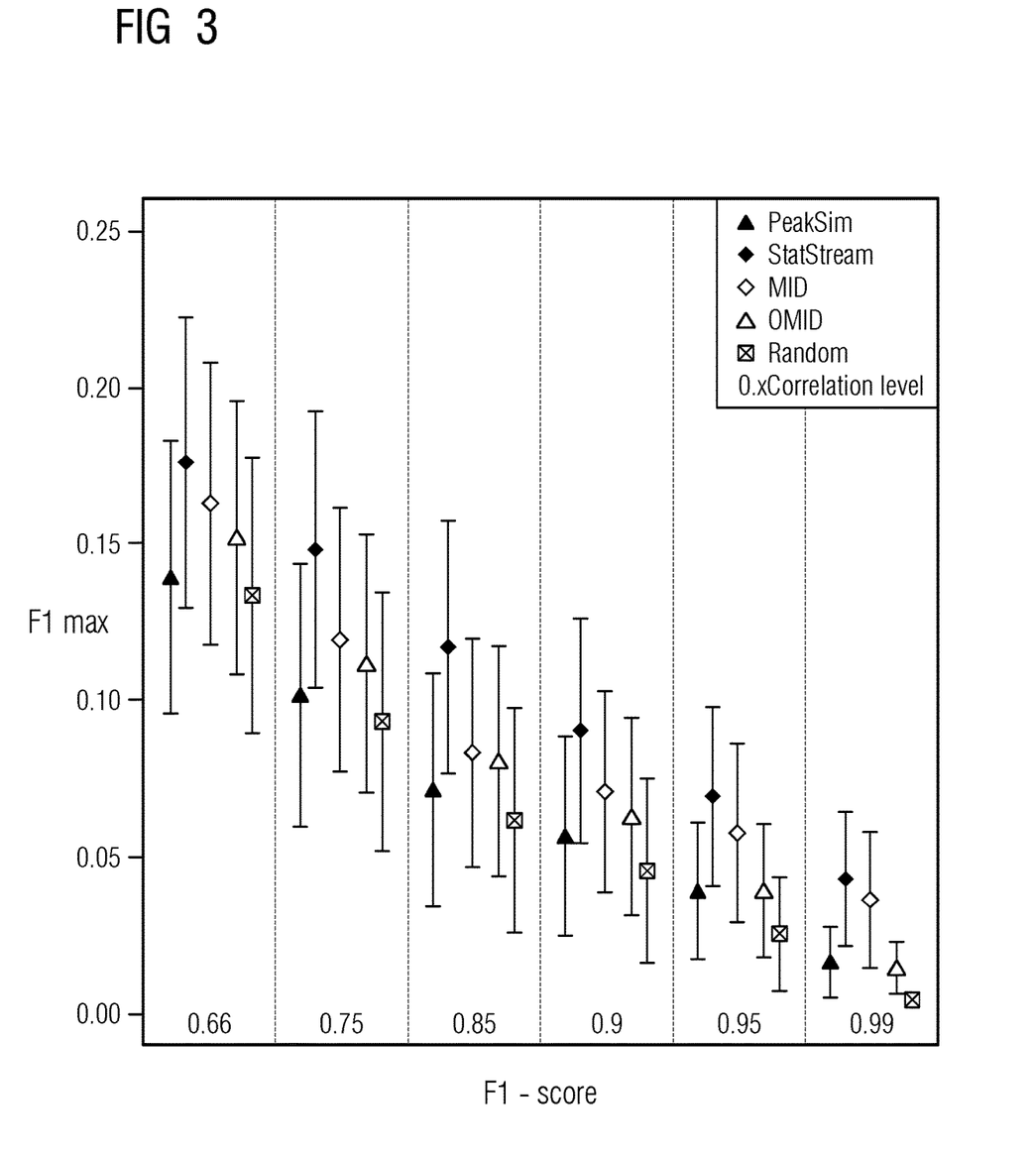
FIG. 3 shows an F1-value on an OL-dataset, wherein areas, separated by dashed lines show performances at different levels of desired correlation.
Figure 4:
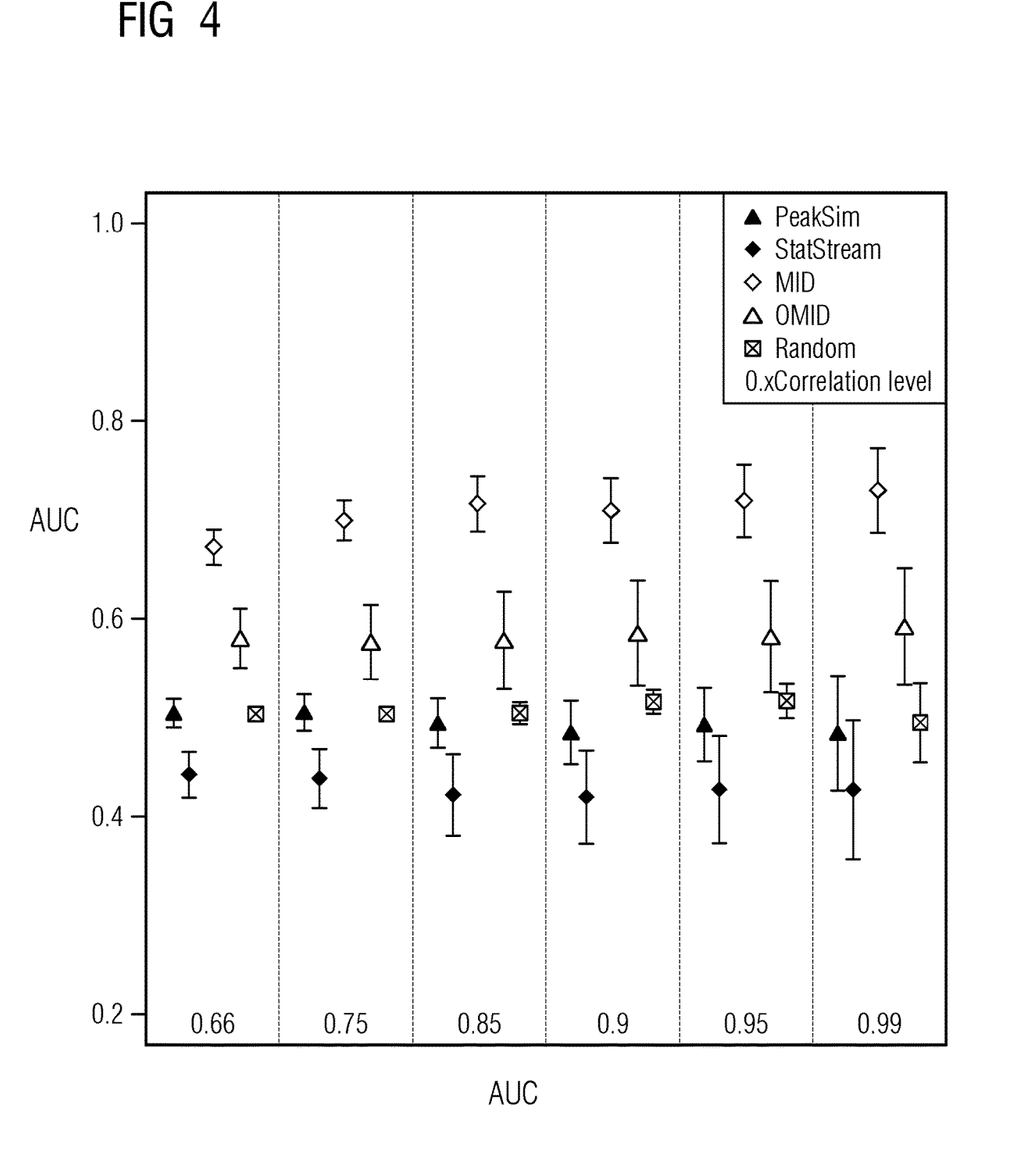
FIG. 4 represents an area under ROC curve on a PA dataset.
Figure 5:
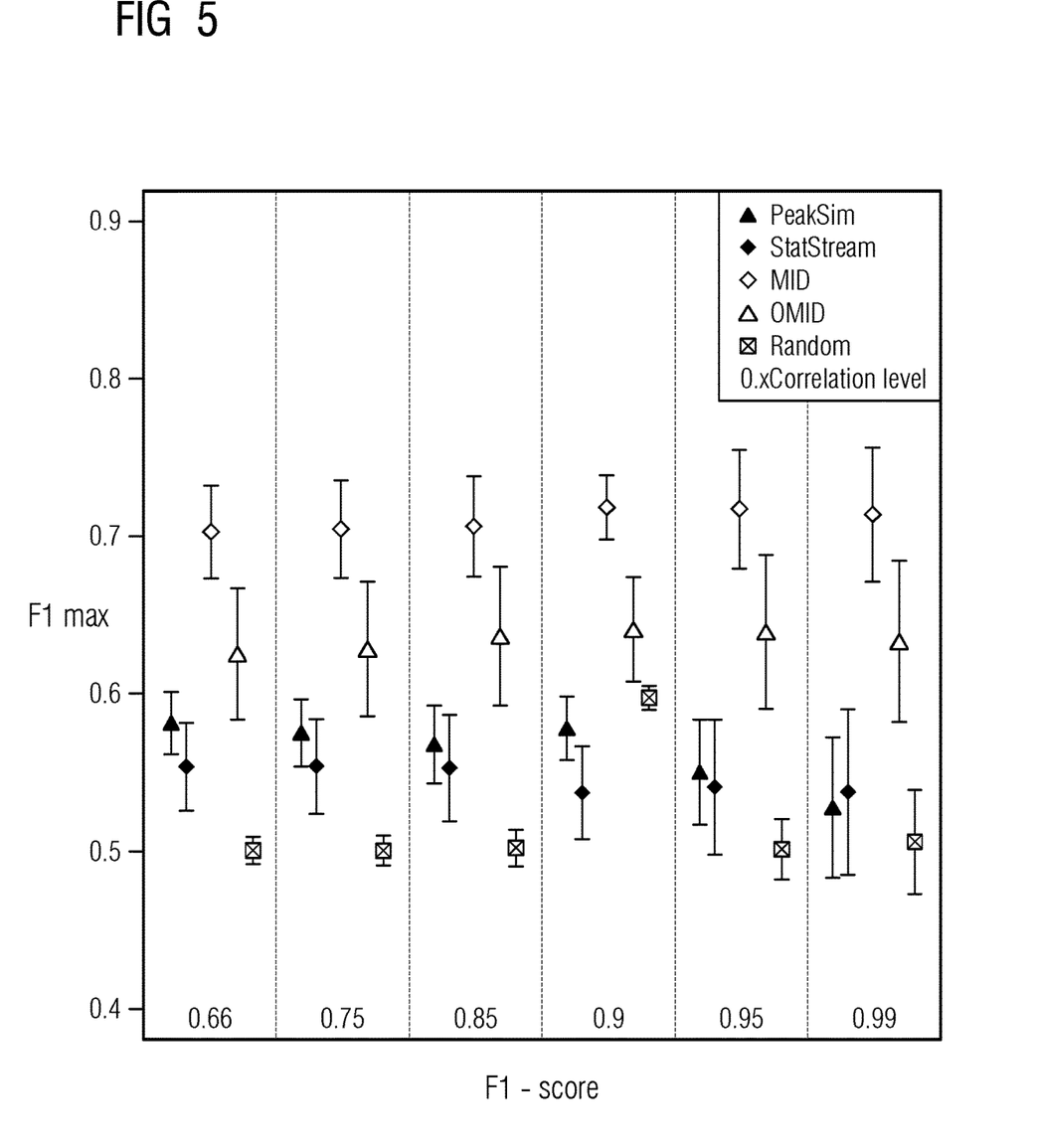
FIG. 5 shows an F1-value on a PA-dataset, wherein areas, separated by dashed lines show performances at different levels of desired correlation.
Figure 6:
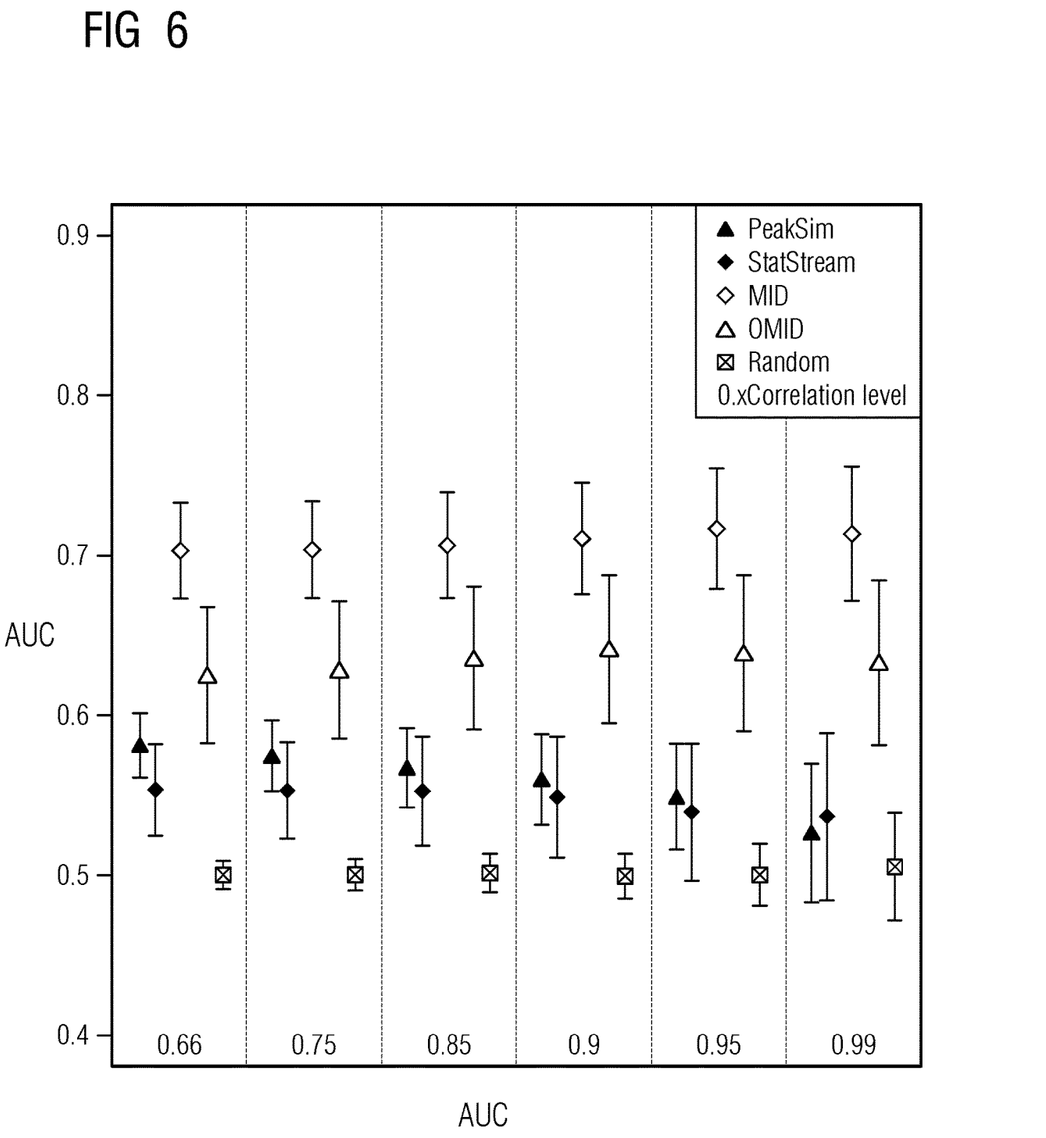
FIG. 6 represents an area under ROC curve on a NA dataset.
Figure 7:
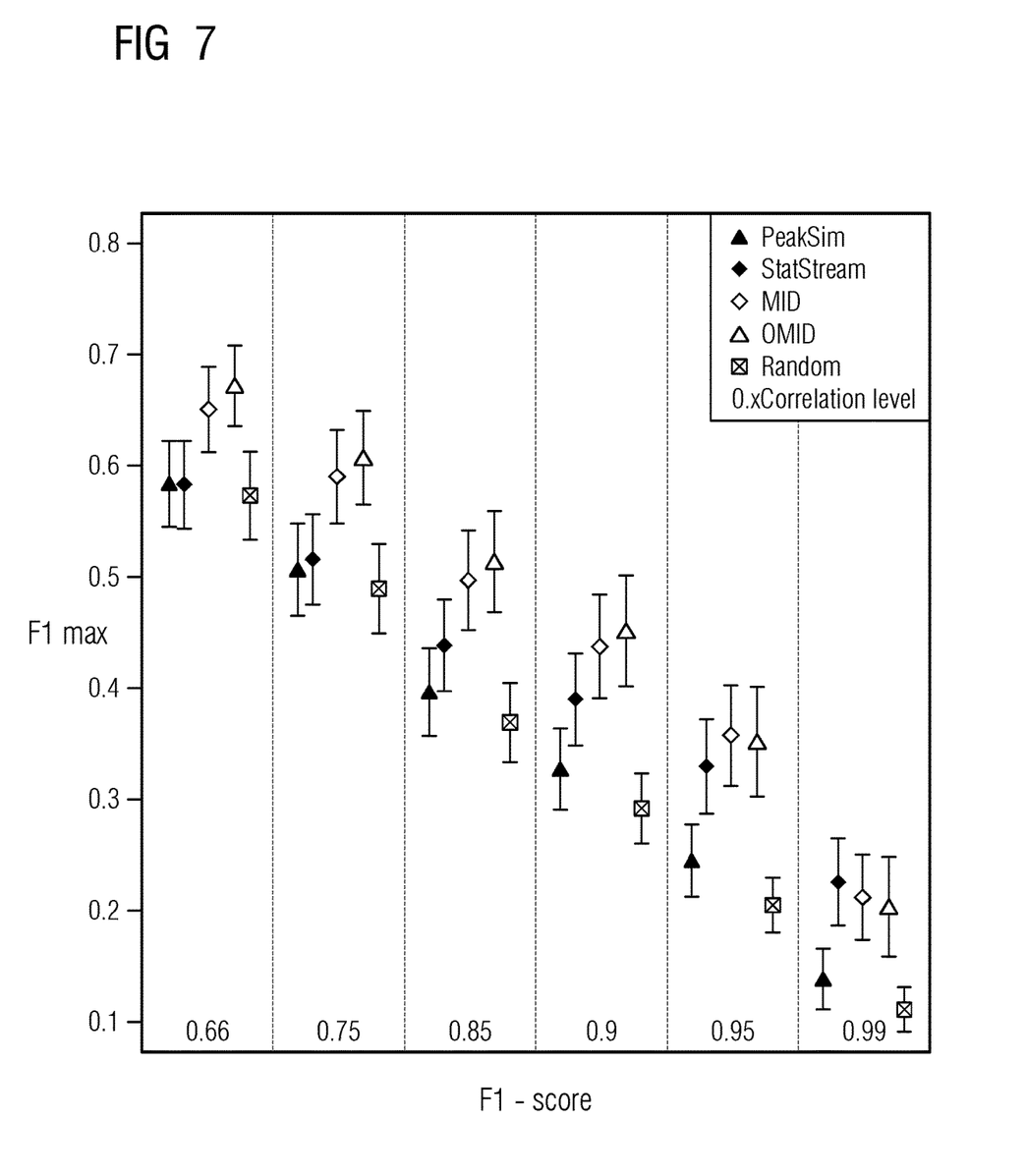
FIG. 7 shows an F1-value on a NA-dataset, wherein areas, separated by dashed lines show performances at different levels of desired correlation.

Considering the area under the ROC curve, we see our method in the window-based version clearly outperforming the other correlation measures in all but one datasets. Usually, equal frequency-binning appears superior but clusters with solely one value skew the histogram boundaries towards one large and several singleton bins with little information. In this case, equal-width binning for once deals better with the skewing and achieves results comparable to the incremental measure (not shown). The incremental binning itself also deals well with missing values because the histogram boundaries do not depend strongly on the local clusters (cf. 3).

The incremental version OMID in general performs not as well when directly compared to MID due to the inevitable loss of precision in the binning but still outclasses the DFT-based measures. In 24 and 36 out of 36 cases, MID and OMID improve over the DFT based measures. The difference between the window based and the incremental measure is statistically significant (p-value<0.05 in a two-sided t-test) in all 18 cases, 6 are in favor of OMID, 12 in favor of MID, but with an overall best performance for OMID. Table 1 shows the complete matrix of pair-wise comparisons for the AUC.

The F1-value shows a similar picture: In all three of the datasets, OMID improves over the other methods. Again we see performing OMID on par with MID and both outperforming the DFT-based methods in 30 and 28 out of 36 cases respectively. Table II shows the complete matrix of pair-wise comparisons for the F1-value.

In summary, although we expected some deterioration due to the slightly fluctuating discretization, OMID performs equally well to MID, and even proves superior when dealing with anomalies like missing values in the data. As proxy for the correlation coefficient, both work significantly better than DFT-based methods. It surprised us that the two DFT-based measures perform barely above Random in some of the datasets.

Execution Time

Figure 8:
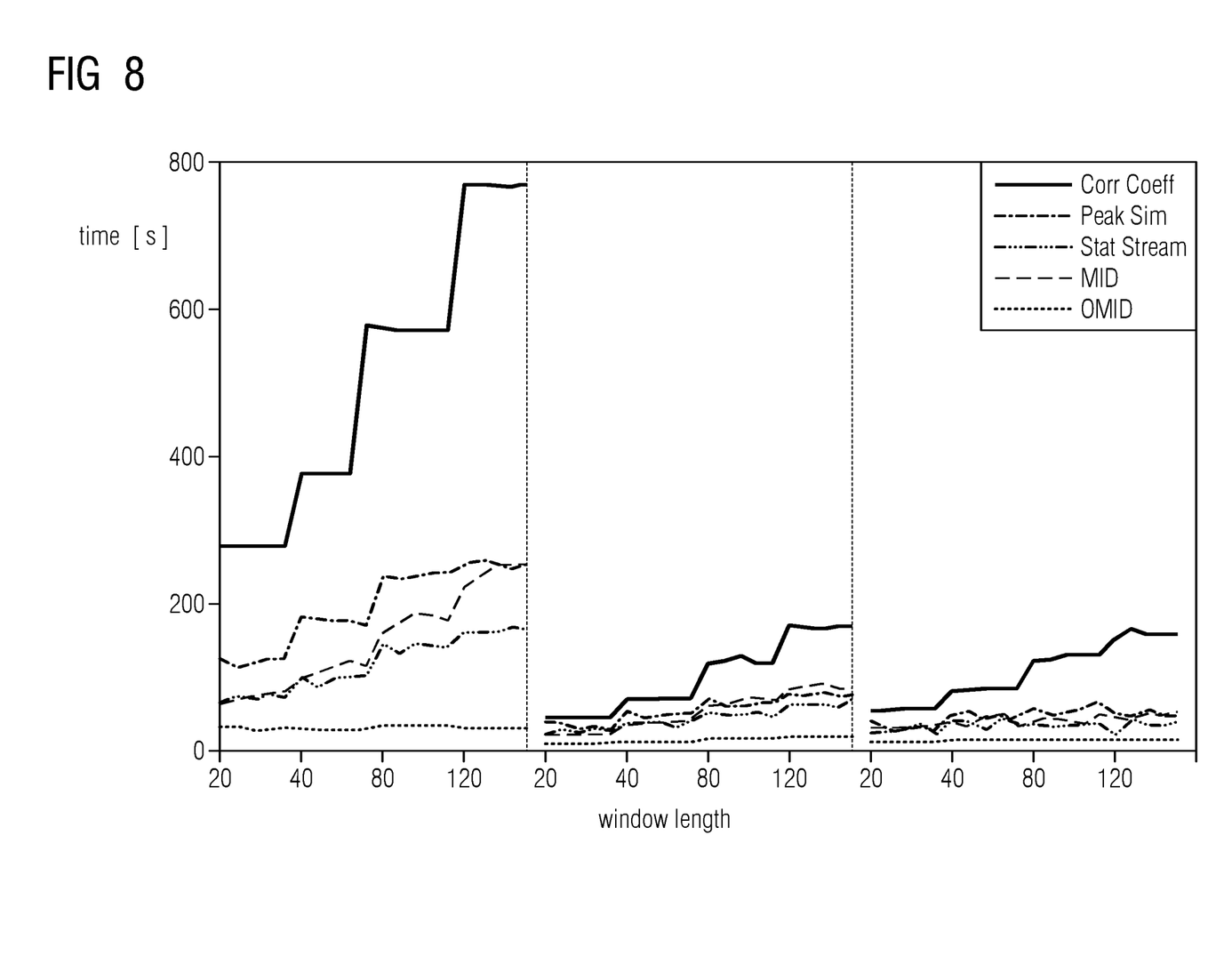
FIG. 8 represents execution time, averaged over 5 runs with increasing window length on the (from left to right) OL, PA, NA dataset.

All experiments have been performed on a PC with an Intel Xeon 1.80 GHz CPU and consumer grade hardware, running a Linux with a current 64-bit kernel, and implemented in python 3.4. FIG. 8 shows execution times over 5 runs of different correlation measures.

Considering that the number of pair-wise dependencies grows quadratic in the number of monitored dimensions, computation speed is an essential factor to deal with high dimensional data. Clearly, the direct calculation of the correlation coefficient is not competitive for large datasets and higher data volume within a window. MID appears about on par with PeakSim and StatStream. The fastest measure is the incremental version OMID, as window size only affects the computation time indirectly through overhead in the calculations, for example through fewer probabilities of zero which slows down the computation.

CONCLUSION

Figure 10:
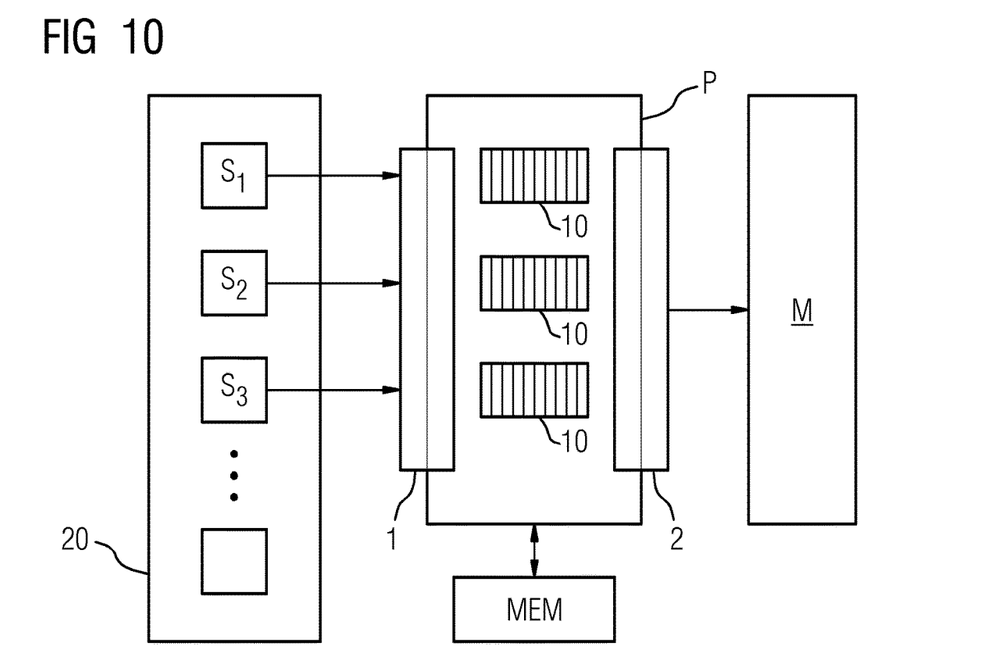
FIG. 10 is a block diagram with respective modules according to an embodiment of the present invention.

Embodiments of the present invention refer to an efficient method for detecting dependencies in a plurality of data streams of sensor data, which is schematically represented in FIG. 10.

Sensor measurements are recorded on a technical device 20, in particular in an energy generation device. The electronic module comprises an input interface 1 which is adapted for capturing the streams of sensor data from different sensors $S_1$, $S_2$, $S_3$, . . . of the technical energy device 20. The device 20 may also be distributed on several plants and entities. A data structure 10 for analysis is provided in form of a sliding window which is incrementally moved over the respective streams of sensor data so that there is an overlap between consecutive windows in the sliding window. A processor P, which is adapted to apply an entropy-based algorithm on the data within the sliding window for calculating data stream dependencies, while incrementally moving the sliding window, wherein only updated data in the sliding window is processed by the entropy based algorithm (OMID). Results of detected dependencies and/or correlations between the sensor data is forwarded to an output interface 2 and may be displayed on a display device M in a histogram-based manner. The processor P may be connected to a storage medium MEM.

Figure 11:
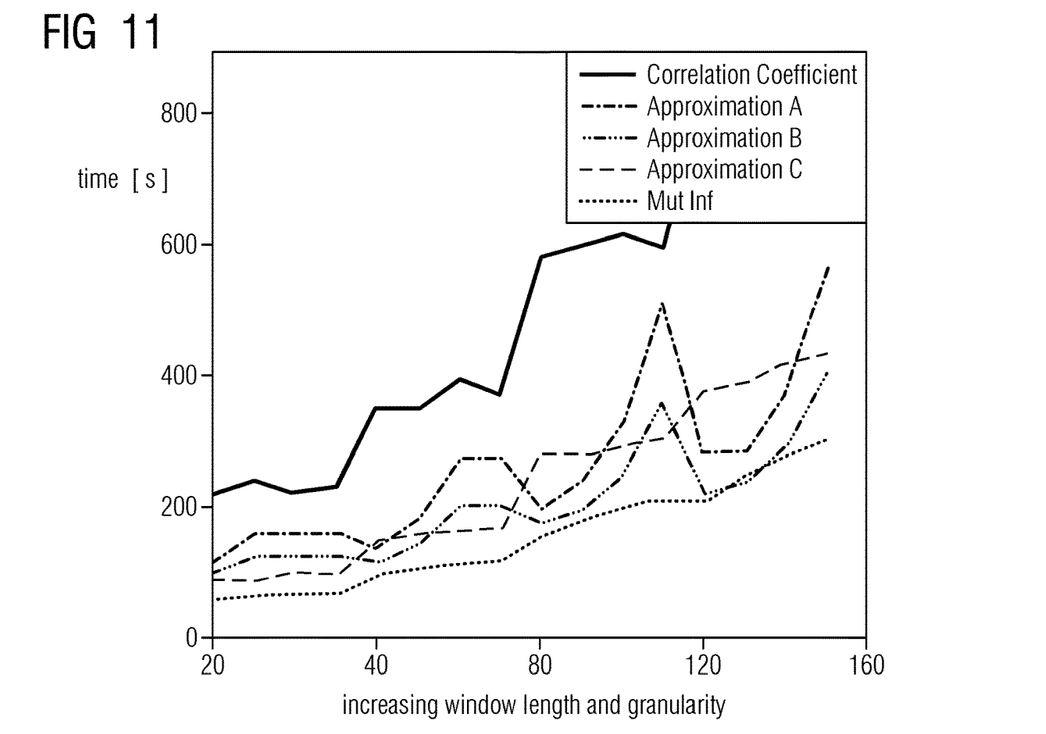
FIG. 11 is a diagram showing the processing time for different correlation detection algorithms.

FIG. 11 shows the processing time for different methods for the detection of a correlation. The topmost black line shows a naïve processing of a correlation coefficient, whereas the lowermost dotted line shows the calculation of mutual information according to embodiments of the present invention and the other three lines show each different calculations and approximations. The graphs show the increasing window length and granularity (on the x-coordinate) compared to the processing time in seconds (on the y-coordinate).

We developed mutual information, a concept from information theory, into a metric that can help to evaluate sensor readings or other streaming data. We describe an incremental algorithm to compute our mutual information based measure with time complexity linear to the length of the data streams. The linear execution time is achieved with a suitable online discretization. We evaluated our algorithm on three real life datasets with up to 8.3 million records and against two other algorithms to detect correlations in data streams. It is as accurate as a comparable non-incremental version and even superior when dealing with local gaps in the data.

In a further embodiment it may be possible, to extend the search for dependencies from pair-wise to groups of 3 or more streams, which increases the computational complexity but brings the potential to extend the analysis to an entropy-based ad-hoc clustering. Mutual information brings a different perspective to stream analysis that is independent from assumptions on the distribution of or relationship between the data streams.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

LITERATURE

Dionisio2004—
A. Dionisio, R. Menezes, and D. A. Mendes, "Mutual information: a measure of dependency for nonlinear time series," Physica A: Statistical Mechanics and its Applications, vol. 344, no. 1, pp. 326-329, 2004.

Seliniotaki2014—
A. Seliniotaki, G. Tzagkarakis, V. Christofides, and P. Tsakalides, "Stream correlation monitoring for uncertainty-aware data processing systems," in Information, Intelligence, Systems and Applications, IISA 2014, The 5th International Conference on. IEEE, 2014, pp. 342-347.

Zhu2002—
Y. Zhu and D. Shasha, "Statstream: Statistical monitoring of thousands of data streams in real time," in Proceedings of the 28th international conference on Very Large Data Bases. VLDB Endowment, 2002, pp. 358-369.

The invention claimed is:

1. A method comprising:
    recording sensor measurements on an energy generation device using a plurality of sensors of the energy generation device, wherein the plurality of sensors are a part of a large-scale wireless sensor network, wherein the plurality of sensors includes a first sensor and a second sensor, and wherein the energy generation device comprises a turbine;
    capturing a first data stream of sensor data from the first sensor and a second data stream of sensor data from the second sensor and providing the first data stream and the second data stream to a processor having a memory, wherein the processor includes a data structure having a configurable length and breadth for analysis in a form of a sliding window which is incrementally moved over the first data stream and second data stream so that there is an overlap between consecutive windows;
    determining a data stream dependency between the first data stream and the second data stream by applying an entropy-based algorithm on the sensor data within the sliding window while incrementally moving the sliding window, wherein:
        only updated data in the sliding window is processed by the entropy-based algorithm,
        as the window over the data moves on, elements $m_t$ of the streams that are out of date drop out and new elements $m_{t+w+1}$ enter,
        probabilities $p(m_t)$ and $p(m_{t+w+1})$ for each of the first data stream and the second data stream and the respective joint probabilities are adjusted, and
        all joint probabilities are updated in a conditional entropy summation;
    validating the sensor measurements based on the determined data stream dependency, wherein validating includes identifying unusual sensor readings and differentiating between unusual sensor readings due to changes in the monitored energy generation device and unusual sensor readings due to measuring uncertainties; and
    operating the energy generation device based on the validated sensor measurements.

2. The method according to claim 1, wherein the sliding window is moved over all streams of sensor data in parallel and contains data from all streams of sensor data from a time period of specified length.

3. The method according to claim 1, wherein the breadth of the sliding window is configured in a configuration phase.

4. The method according to claim 1, wherein the method is executed in real time.

5. The method according to claim 1, wherein the method further comprises:
    providing a result via an output interface on an output device, representing whether or not there exists a dependency between the sensor data streams and if yes, whether the dependency is represented correctly.

6. The method according to claim 1, wherein the respective data streams comprise continuous and/or discrete data.

7. The method according to claim 1, wherein dependencies of the data streams are computed in a window-wise manner.

8. The method according to claim 1, wherein dependencies of the data streams are computed in an incremental manner and in particular by means of an online discretization.

9. A computer program product, comprising a non-transitory computer readable storage medium storing a program of machine-readable instructions executable by a digital processing apparatus to perform the method according to claim 1 when the program is executed on the digital processing apparatus.

10. An electronic module for detecting dependencies of at least two data streams of sensor measurements, which are recorded on an energy generation device including a turbine, comprising:
    an input interface which is adapted for capturing the at least two data streams of sensor data from a plurality of sensors of the energy generation device including the turbine, the plurality of sensors being a part of a large-scale wireless sensor network, wherein a first data stream is captured from a first sensor and a second data stream is captured from a second sensor;
    a data structure with configurable length and breadth for analysis in a form of a sliding window which is incrementally moved over the first data stream and the second data stream so that there is an overlap between consecutive windows;
    a processor, which is adapted to:
        determine a data stream dependency between the first data stream and the second data stream by applying an entropy-based algorithm on the data within the sliding window, while incrementally moving the sliding window, wherein only updated data in the sliding window is processed by the entropy-based algorithm, wherein as the window over the data moves on, elements $m_t$ of the streams that are out of date drop out and new elements $m_{t+w+1}$ enter, wherein probabilities $p(m_t)$ and $p(m_{t+w+1})$ for each stream and the respective joint probabilities are adjusted, and wherein all joint probabilities are updated in a conditional entropy summation, and validate the sensor measurements based on the determined data stream dependency, wherein validating includes identifying unusual sensor readings and differentiating between unusual sensor readings due to changes in the monitored energy generation device and unusual sensor readings due to measuring uncertainties;
wherein the energy generation device including the turbine is operated based on the validated sensor measurements.

* * * * *